UNITED STATES PATENT OFFICE.

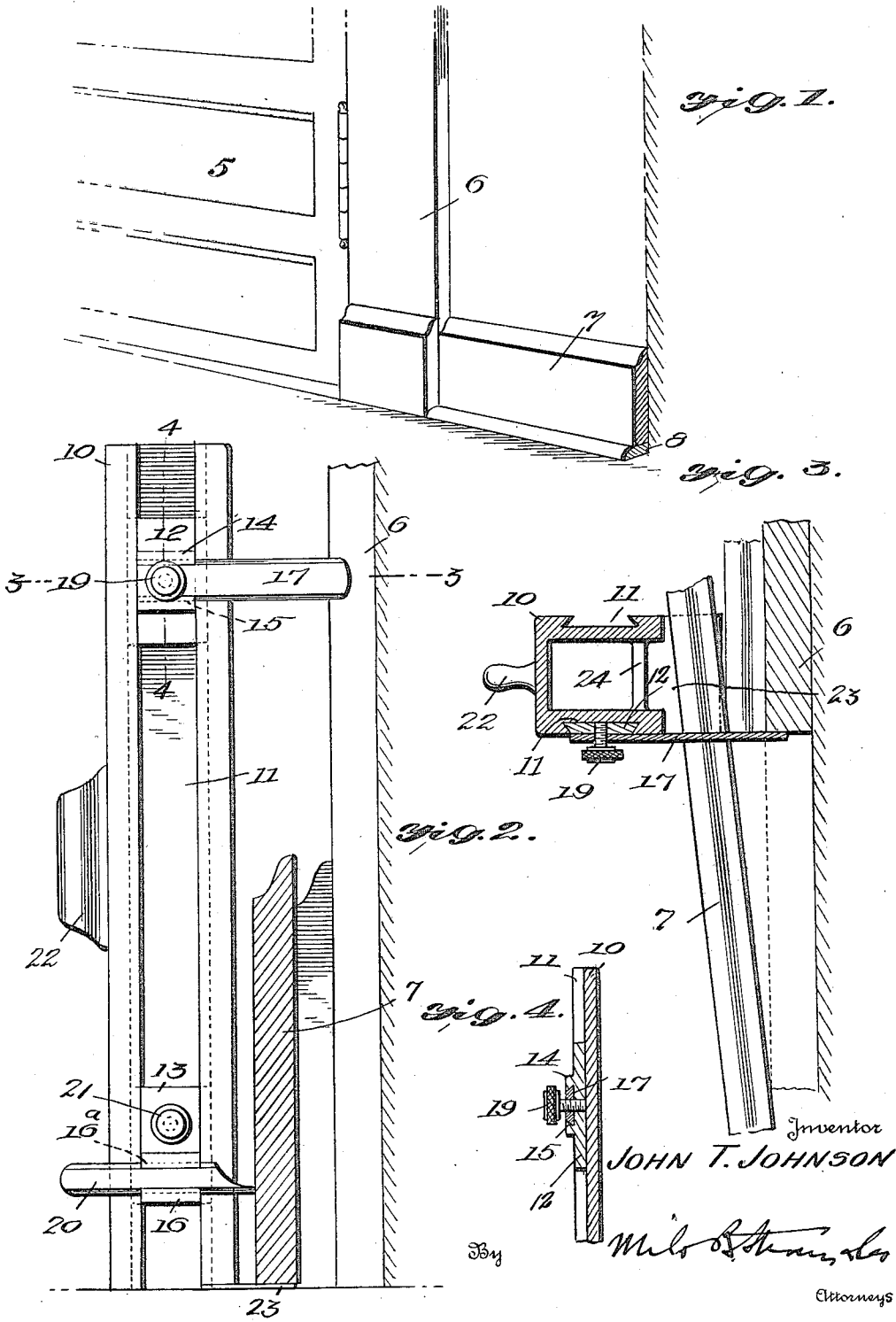

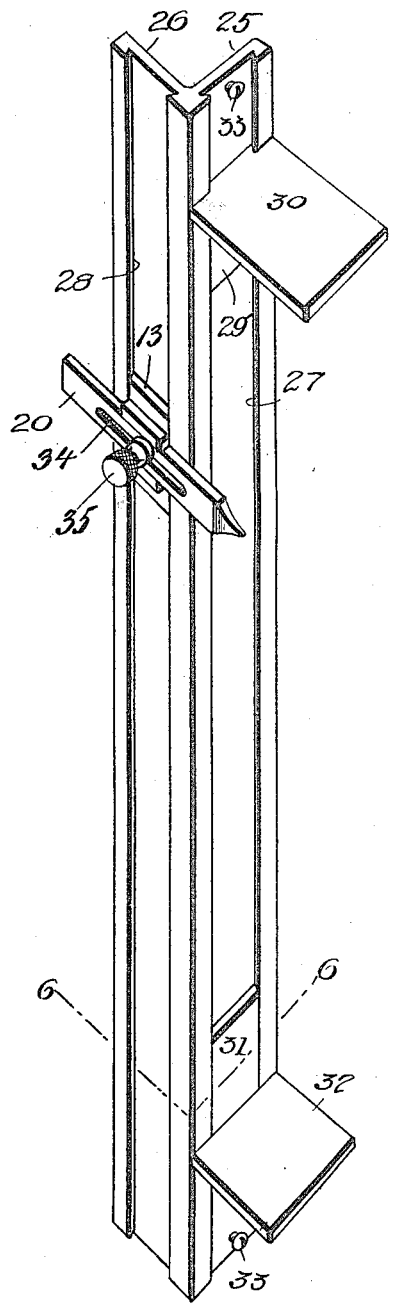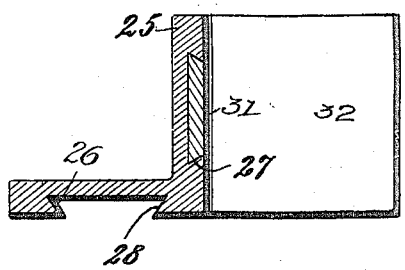

JOHN T. JOHNSON, OF CHICAGO, ILLINOIS.

GAGE.

1,225,819. Specification of Letters Patent. Patented May 15, 1917.

Application filed November 17, 1916. Serial No. 131,888.

*To all whom it may concern:*

Be it known that I, JOHN T. JOHNSON, a citizen of the United States, residing at Chicago, in the county of Cook and State of Illinois, have invented new and useful Improvements in Gages, of which the following is a specification.

The gage which is the subject matter of the present application for patent is designed for facilitating the measurement of certain parts of the woodwork in a room, the device being so constructed that a scratch mark may be made to mark the length of certain rails for the proper fitting thereof to other rails.

In order that the invention may be better understood, reference is had to the accompanying drawing forming a part of this specification, and in said drawing, Figure 1 is a perspective view of the structure in connection with which the invention is employed;

Fig. 2 is an elevation of the device showing the manner in which it is used;

Fig. 3 is a horizontal section on the line 3—3 of Fig. 2;

Fig. 4 is a vertical section on the line 4—4 of Fig. 2.

Fig. 5 is a perspective view showing a modification, and

Fig. 6 is a cross-section thereof on the line 6—6.

In the drawing, 5 denotes a fragment of a door, and 6 denotes a molding on one side of the door opening extending down to the base rail 7, which latter seats on the floor molding 8. In a structure of this kind, after the door and the molding have been installed, it is a difficult and time-consuming job to measure off the length of the base rail to make a proper fit with the edge of the molding, and the device which will now be described has been designed to facilitate the proper fitting of the parts. The device consists of the following parts:

A straight edge in the form of a bar 10 of channeled cross section is the base of the device. In the outer surface of the sides or flanges of the bar are undercut, longitudinal grooves 11, in one of which grooves are mounted spaced slides 12 and 13, respectively. The slide 12 has a raised portion 14 protruding from the groove and provided with an undercut transverse groove 15, and the slide 13 has a similar raised portion 16 provided with an undercut transverse groove 16ª. The grooves 15 and 16ª extend at a right angle to the base bar 10.

In the groove 15 seats the inner end of an arm 17 extending laterally from the base bar 10 at a right angle thereto. A set screw 19 is threaded through the arm 17 and the slide 12 to engage the base bar, and thus lock the slide in the groove 11 of the base bar, and also to lock the arm 17 to the slide in the groove thereof.

The slide 13 carries an arm 20 which also projects laterally from the same side of the base bar 10 as the arm 17. The outer end of the arm 20 is pointed so that it may serve as a scratcher or marker. The arm seats slidably in the groove 16ª of the slide 13, so that it may be adjusted according to the thickness of the part to be marked.

A set screw 21 threaded through the slide 13 to engage the base bar 10 serves to station said slide in the groove 11 and to slightly bind it for steadier movement when slid.

The rear edge of the base bar 10 has a handle 22, and at the bottom is a projecting flange 23 serving as a base and adapted to be set under the part to be marked.

In use, the base bar 10 is placed in erect position abutting against the molding 6, and with the flange 23 beneath the base rail 7. The device is then moved sidewise until the arm 17 strikes the outer edge of the molding against which the end of the base rail 7 is to abut. The base rail 7 now lies in front of the molding 6 as it has not yet been cut off and fitted in place. The scratch device 20 being now directly below the arm 17, and with its point opposite the base rail 7, the slide 13 is drawn up or down in the groove 11 so that the device 20 makes a vertical mark across the face of the base rail 7 at the place where it must be cut off to properly fit the molding 6.

The groove 11 on the opposite side of the base bar 10 receives the slides 12 and 13 for work on the other side of the door opening, or "left hand" work.

The channel of the base bar 10 is spanned by spacers 24 to stiffen the sides and hold the same in shape.

Referring to Figs. 5 and 6 which show another embodiment of the invention, the base bar is angular or L-shaped in cross-section, its two branches being shown at 25 and 26, respectively, and having in their outer faces undercut longitudinal grooves, the groove of the branch 25 being shown at 27 and the groove of the branch 26, at 28. In the groove 28 is mounted the scratcher or marking device 20. In the groove 27 is mounted a slide block 29 having at its outer end a horizontally extending plate 30, and below the same is a slide block 31 also having a horizontal plate 32. The slide blocks 29 and 31 are shaped to fit in the undercut of the groove 27, and they are fitted snugly in the groove so that they will remain stationary in any position to which they may be moved. At the upper and lower ends of the groove 27 are screws or similar abutments 33 for preventing the slide blocks from slipping out of the groove. The lower plate 32 serves the same purpose as the base plate 23 hereinbefore described, and the upper plate 30 is brought down to rest on the base rail 7 to steady the tool while the marking device 20 is in operation. The scratcher 20 has a longitudinal slot 34 through which a set screw 35 passes into the slide 13 carrying said scratcher, whereby the scratcher is locked in adjusted position.

In the use of the device the plate 30 takes the place of the arm 17 in the first described device. If a left-handed measurement is desired, the entire device is inverted so that the function of the plates 30 and 32 will be reversed.

I claim:—

1. A gage comprising a straight edge base bar, spaced slides carried by the bar, one of the slides having a projecting part extending laterally from the base bar, and a scratcher carried by the other slide and projecting laterally from the same side of the base bar as the aforesaid projecting part of the first-mentioned slide.

2. A gage comprising a straight edge base bar, spaced slides carried by the bar, one of the slides having a projecting part extending laterally from the base bar, and a longitudinally adjustable scratcher carried by the other slide and projecting laterally from the same side of the base bar as the aforesaid projecting part of the first-mentioned slide.

In testimony whereof I affix my signature.

JOHN T. JOHNSON.